May 28, 1968 R. S. FARR 3,385,198
AIR FLOW DIRECTING AND PROTECTIVE GRILL
Filed May 11, 1966

INVENTOR.
RICHARD S. FARR
BY Lyon & Lyon
ATTORNEYS

United States Patent Office 3,385,198
Patented May 28, 1968

3,385,198
AIR FLOW DIRECTING AND PROTECTIVE GRILL
Richard S. Farr, Los Angeles, Calif., assignor to Farr Company, El Segundo, Calif., a corporation of California
Filed May 11, 1966, Ser. No. 549,262
4 Claims. (Cl. 98—121)

ABSTRACT OF THE DISCLOSURE

A grill apparatus for protecting and directing air flow into high volume air ingesting machinery. A multiplicity of air foil shaped and roll formed vanes are mounted in parallel spaced relationship a short distance apart with the nose portion of each vane connected to lateral reinforcing bars to provide protection with a minimum pressure drop across the grill.

---

This invention relates to a device for mounting on the intake of any form of air ingesting apparatus which by its nature or the locale of its operation requires protection from the intrusion of foreign objects of any appreciable size and, in particular, the invention is directed to such a device capable of accommodating high velocities of air flow without producing excessive pressure drops across the device.

Numerous types of apparatus ingest air for their operation and require protection from the intrusion of objects, both airborne and otherwise, which might clog or damage the apparatus. While a simple wire mesh screen of an appropriate gauge may be adequate for most installations, there are certain installations which require extremely rugged protection and yet the rate of air ingestion is so high as to prohibit the use of a mesh screen due to the resultant pressure drop losses. For example, the radiators on locomotives require high rates of air flow therethrough and the environment of their operation is such as to frequently result in both airborne and heavy objects being directed toward the radiator. However the required efficiency of operation whereby the air flow cannot be unduly inhibited has dictated the use of widely spaced steel bars of thick cross section as the only protection for the radiator. Specifically, it has been conventional to employ one-quarter inch by one inch bars positioned edgewise with two and one-half inch spaces between the bars as the protecting grill for the locomotive radiator. Narrower spacing has been avoided in order to minimize the pressure drop across the grill. However, the lack of complete protection afforded by the two and one-half inch spacing is obvious.

Another factor of concern in an air ingesting apparatus is controlling the direction of air flow. It is well known to those skilled in the art that substantial inefficiency can be avoided by minimizing the turbulence in air flow and predirecting the air flow into the apparatus in the most desirable direction.

Accordingly, it is a principal object of this invention to provide a novel form of protective and flow-directing grill which is comprised of a multiplicity of closely spaced vanes of an efficient air foil shape to effectively prevent the intrusion of objects with a minimum of pressure drop across the grill and yet enhance the operation of the air ingesting apparatus by properly directing the air flow.

Another object of this invention is to provide a novel form of protective grill comprised of closely spaced vanes of a thin width and yet substantial depth for both structural strength and accomplishing the straightening of air flow to the desired direction. It is a particular object of this invention to provide such an arrangement wherein the spacing between vanes is approximately one-quarter of an inch and yet the pressure drop produced is nominal.

A still further object of this invention is to provide a novel form of protective grill for air ingesting apparatus wherein a multiplicity of vanes are closely spaced across the intake opening with each vane comprised of an air foil shape having a bluntly rounded upstream end and tapering to a near point at the downstream end. A further object of this invention is to provide such a grill wherein the vane is formed from sheet metal and hollow.

Other and more detailed objects and advantages of this invention will appear from the following description and the accompanying drawings, wherein.

Figure 2:
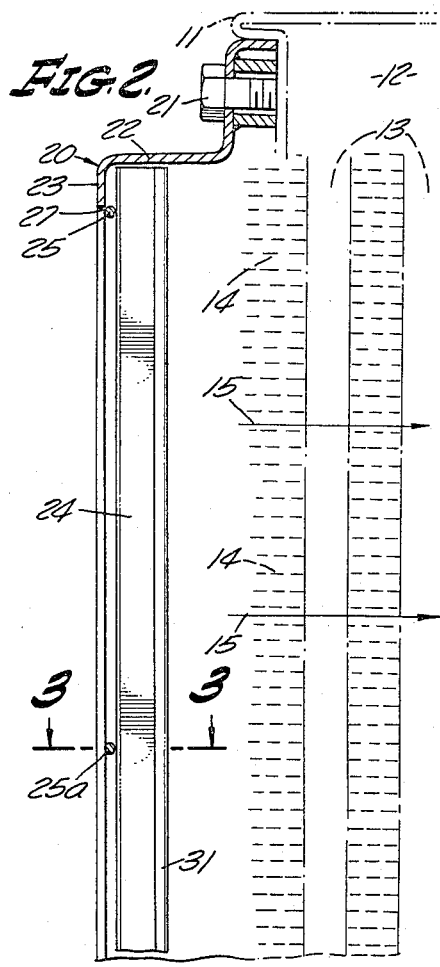
FIGURE 2 is a fragmentary sectional elevation taken substantially on the line 2—2 in FIGURE 1 and illustrating the grill as mounted on the front of a conventional radiator.
Figure 4:
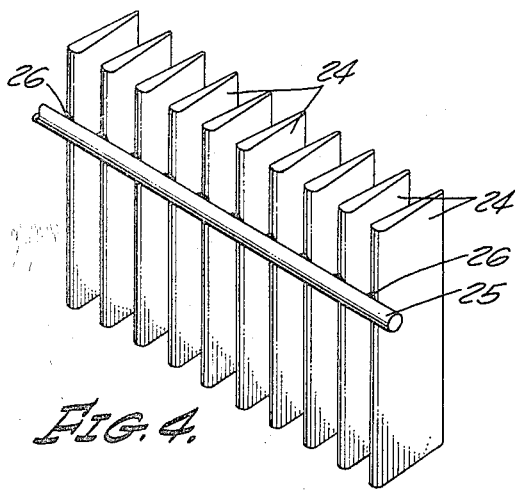
FIGURE 4 is a perspective view of a portion of the grill and illustrating the lateral reinforcing and positioning rod.

Referring now in detail to the drawings, the device of this invention, generally designated 10, is provided with an appropriate frame for mounting on the particular air ingesting apparatus. Here the grill 10 is adapted to be mounted on the front of a radiator 11 shown in phantom lines in FIGURE 2. As is conventional, the radiator 11 may include an upper tank 12 to which are connected flow tubes 13 extending downwardly through thin metallic fins 14 which are positioned in a relatively horizontal plane. Therefore the most efficient direction for air flow through the radiator 11 is straight through in the horizontal direction as indicated by arrows 15.

The grill device 10 includes a frame 20 of an appropriate shape for encircling the periphery of the radiator 11 whereby all of the air intended to flow through the radiator 11 must flow through the area within frame 20. Bolts 21 extend through frame 20 and serve to releasably connect the device 10 to the radiator 11. Here the frame 20 includes an outwardly extending wall section 22 for providing ample space between the front of the grill and the front of the radiator. The section 22 terminates in an inwardly directed flange 23 that, in effect, defines the air intake area.

Figure 1:
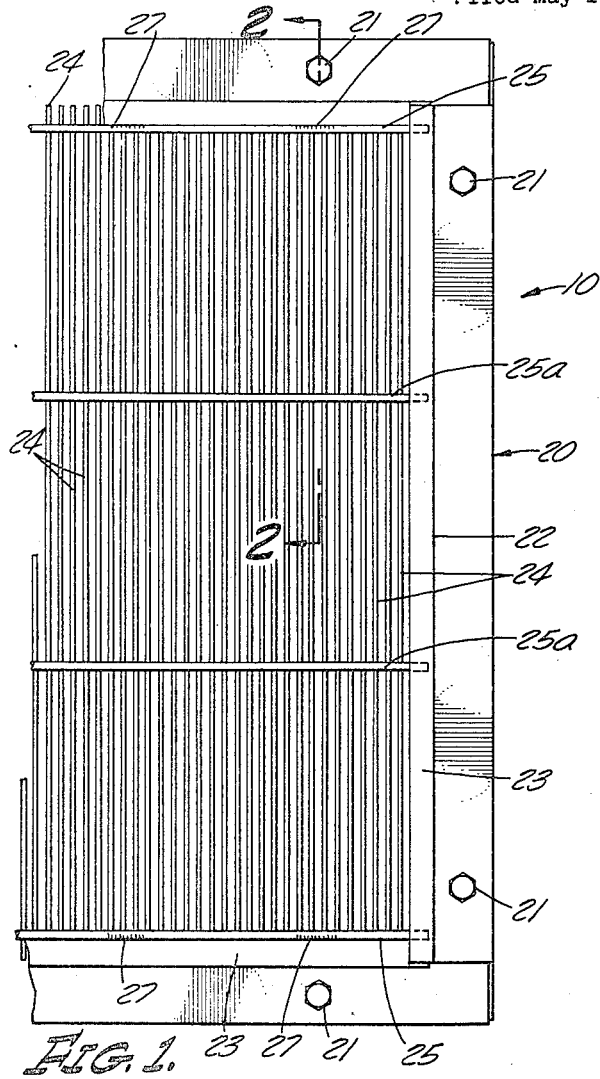
FIGURE 1 is a fragmentary elevation view of the grill of this invention.

A multiplicity of individual vanes 24 extend the height of the frame 20 and are positioned in spaced relationship across the entire lateral width of the frame 20 within the spaced defined by wall sections 22 of the frame. It will be obvious to those skilled in the art that the vanes 24 may extend horizontally or on an incline if desired. For ease and accuracy of assembly the vanes 24 are secured near their ends to rods 25 by spot welds 26 before assembly to the frame. When the length of the vanes is such as to result in a possible flexing intermediate their ends, reinforcing bars 25a may be appropriately provided and secured to the leading edges of the vanes such as the two rods 25a shown in FIGURE 1. The assembly of vanes 24 and rods 25 is mounted in the frame 20 in any convenient manner such as by skip welds 27 at locations along the upper and lower flanges 23 of the frame. In addition, the ends of the rods 25 and 25a may be secured to the vertical frame flanges 23.

Figure 3:
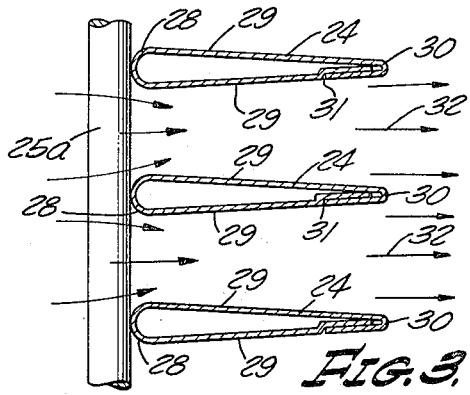
FIGURE 3 is a highly enlarged fragmentary sectional plan view taken substantially on the line 3—3 in FIGURE 2.

The vanes 24 are of a shape and appropriately positioned for producing the minimum resistance to air flow, the maximum protection to the air ingesting apparatus, and an efficient directing of the air flow. Referring in particular to FIGURE 3 the leading or upstream end of the vane 24 is comprised of a rounded nose portion 28 which may conveniently be semi-circular in cross section. The nose portion 28 comprises the greatest lateral width of the vane and therefore the sides 29 converge toward each other in the downstream direction. The downstream extremity of the vane 24 is formed to as near a point 30 as is physically practical and possible in view of the method of construction. As shown in the drawings, the vanes 24 are preferably roll formed of sheet metal, overlapping at 31 along one side whereby a vane of substantial strength is obtained at a minimum of cost and weight. It is to be noted that the relative dimensions of the vanes 24 are such that the lateral width is but a fraction of the longitudinal depth of the vane. Moreover, the vanes are spaced from each other a distance substantially less than the longitudinal depth of the vane whereby the air flowing between vanes is substantially straighten in its path of flow as shown by arrows 32. Specifically, a highly successful embodiment of this invention has been developed which employs the proportions illustrated in the drawings wherein the longitudinal depth of each vane 24 is three-quarters of an inch, the lateral width of each vane is one-eighth inch, the center-to-center spacing of the vanes is three-eighths of an inch thereby leaving only a quarter of an inch space between adjacent vanes at their nose portions 28. This embodiment offers the extreme structural strength desired with a minimal pressure drop even under high rates of air flow.

Having fully described my invention it is to be understood that I do not wish to be limited to the details herein set forth or shown in the drawings but rather my invention is of the full scope of the appended claims.

I claim:

1. In a protective and flow-directing device for a high volume air ingesting apparatus, comprising, a frame adapted for attachment to the air ingesting apparatus to encircle the area of air ingestion, a multiplicity of laterally spaced and parallel vanes mounted on said frame and extending across the entire area of air ingestion, each said vane having a cross-sectional air foil shape of substantially greater longitudinal depth in the direction of air flow than the lateral width in the direction of vane spacing, said cross-sectional shape of each said vane comprised of a rounded nose portion at the upstream longitudinal extremity comprising the maximum lateral width of the vane and sides continuously converging to a near point at the downstream longitudinal extremity for minimizing the pressure drop in the flowing air, said longitudinal depth of each vane also being substantially greater than the said spacing between vanes for straightening and directing the air flow, and a plurality of round reinforcing bars extending laterally across and joined to the nose portions of said vanes at a location intermediate the ends of said vanes with the vanes depending from said bars in the direction of air flow whereby the lateral spacing of the vanes is retained.

2. The device of claim 1 in which one of said laterally extending reinforcing bars is provided at each end of said vanes and all of said bars are preassembled to said vanes for establishing and maintaining said spacing.

3. The device of claim 1 in which said vanes are roll formed of sheet metal and having a seam on one said side near said downstream longitudinal extremity, said seam formed with the sheet metal overlapping and having one portion indented the thickness of the sheet metal and into engagement with the interior of the other side of the vane for accommodating the overlapping sheet metal and creating a triple thickness of sheet metal at the said downstream longitudinal extremity.

4. A protective and flow-directing device for a high volume air ingesting apparatus, comprising, a frame means adapted for encircling the area of air ingestion, a multiplicity of spaced vanes rigidly mounted on said frame means and extending across the area of air ingestion, each said vane having a substantially greater depth than width, each said vane having a smooth rounded nose portion at the upstream extremity and sides converging therefrom toward the downstream extremity for minimizing the pressure drop in the flowing air, said vanes being roll formed of sheet metal having one edge smoothly overlapping another indented edge at one side near the downstream extremity creating a triple thickness of sheet metal at the smooth downstream extremity, and each said vane rigidly connected by said nose portion to said frame means to depend downstream from said frame means.

References Cited
UNITED STATES PATENTS

| | | | |
|---|---|---|---|
| 1,951,653 | 3/1934 | Green | 52—473 |
| 1,985,372 | 12/1934 | Herz | 52—473 X |
| 3,270,657 | 9/1966 | Jaye | 98—110 |

ROBERT A. O'LEARY, *Primary Examiner.*

M. A. ANTONAKAS, *Assistant Examiner.*